US007698417B2

(12) United States Patent
Rizzi et al.

(10) Patent No.: US 7,698,417 B2
(45) Date of Patent: Apr. 13, 2010

(54) OPTIMIZED PERFORMANCE COUNTER MONITORING

(75) Inventors: Lorenzo Rizzi, Kirkland, WA (US); Gerardo Dilillo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 11/152,941

(22) Filed: Jun. 15, 2005

(65) Prior Publication Data

US 2006/0287738 A1    Dec. 21, 2006

(51) Int. Cl.
G06F 15/16 (2006.01)
G06F 15/173 (2006.01)
G06F 15/177 (2006.01)
G06F 11/00 (2006.01)
G06F 11/30 (2006.01)
G06F 17/40 (2006.01)

(52) U.S. Cl. ........................ 709/224; 709/235; 709/232; 709/233; 715/736; 702/186; 702/187; 702/188

(58) Field of Classification Search ................. 709/223, 709/224, 232, 233, 235; 700/32–36; 702/62, 702/182, 186–189; 715/734, 736
See application file for complete search history.

(56) References Cited

U.S. PATENT DOCUMENTS

| | | | |
|---|---|---|---|
| 5,619,656 A * | 4/1997 | Graf | 709/224 |
| 5,867,495 A | 2/1999 | Elliott et al. | |
| 6,453,346 B1 * | 9/2002 | Garg et al. | 709/224 |
| 6,587,878 B1 * | 7/2003 | Merriam | 709/224 |
| 6,901,442 B1 * | 5/2005 | Schwaller et al. | 709/224 |
| 7,062,537 B2 | 6/2006 | Aziz et al. | |
| 7,065,566 B2 * | 6/2006 | Menard et al. | 709/223 |
| 7,197,559 B2 * | 3/2007 | Goldstein et al. | 709/224 |
| 7,499,994 B2 * | 3/2009 | Sapiro et al. | 709/224 |
| 7,505,415 B2 * | 3/2009 | Murgatroyd et al. | 370/241 |
| 7,630,956 B2 * | 12/2009 | Wyatt et al. | 707/2 |
| 2002/0184363 A1 * | 12/2002 | Viavant et al. | 709/224 |
| 2002/0198891 A1 | 12/2002 | Li et al. | |
| 2003/0018627 A1 | 1/2003 | Turner et al. | |
| 2004/0015583 A1 | 1/2004 | Barrett et al. | |
| 2004/0148299 A1 | 7/2004 | Teegan et al. | |
| 2005/0114448 A1 | 5/2005 | Skomra | |
| 2005/0198298 A1 * | 9/2005 | Nishikawa et al. | 709/226 |
| 2006/0004749 A1 | 1/2006 | Dettinger et al. | |
| 2006/0111921 A1 | 5/2006 | Chang et al. | |
| 2006/0117387 A1 * | 6/2006 | Gunsalus et al. | 726/24 |
| 2006/0167891 A1 * | 7/2006 | Blaisdell et al. | 707/10 |
| 2006/0245369 A1 * | 11/2006 | Schimmelpfeng et al. | 370/252 |
| 2007/0022093 A1 | 1/2007 | Wyatt et al. | |

* cited by examiner

*Primary Examiner*—Ario Etienne
*Assistant Examiner*—Gregory G Todd
(74) *Attorney, Agent, or Firm*—Lee & Hayes, PLLC (57) ABSTRACT

In a management system, computing devices collect sample performance values that describe utilization or usage of resources or processes. The sample performance values may be in the form of performance data or performance counters. Sample performance values are either sent or not sent to a management server, based on a delta value of a current collected sample performance value and a last current collected sample value. Plots may be constructed based on actual received sample performance values and interpolated, or estimated sample performance values based on a known frequency at which the sample performance values are collected.

16 Claims, 6 Drawing Sheets

OPTIMIZED PERFORMANCE COUNTER MONITORING

BACKGROUND

Management systems typically include a management server and multiple computers or computing devices. Such computing devices may be known as "clients". The management server may receive performance data from the clients. Performance data may be conveyed through what are commonly known as performance counters.

Exemplary performance data includes utilization as to resources resident at a client, such as a client processor, client memory, client disk storage, etc. Furthermore, performance data may also be provided as certain processes, such as network interconnections between the client and management server.

The received performance data may be used by administrators at the management server to determine the quality of service (QOS) provided at the clients. QOS can include issues related to "denial of service" attacks, data throughput to clients, ability of clients to process received data, etc. Administrators may plot such performance data on a graph over time. For example, percentage of processor usage may be plotted against time to create a processor utilization data plot. By analyzing such data plots, trends can be identified and/or problems can be corrected, leading to improved service for clients.

Performance counters or performance data may be sent to the management server over a defined frequency. In other words, performance data from client devices are sent to the management server over a regular interval of time. The greater the frequency that performance data is sent (i.e., the more performance data that is received over a particular period), the greater accuracy is provided.

Considering that there may be numerous performance data or performance counters that are sent, the amount of information (i.e., performance data or performance counter) that is sent can be significant. Considering that one or more networks that are used to connect the management server and client devices may have bandwidth constraints, and resource constraints at the management server and client devices, the amount of information sent can lead to network congestion and resource problems at the management server and client devices. A need exists to provide performance data to properly allow administrators to monitor client devices; however, limitations should be made as to network and resource usage.

SUMMARY

Optimized performance counter monitoring in a management system is performed by taking a sample performance value, waiting for a period of time, and determining if a succeeding performance value falls within a delta In one implementation, computing devices collect sample performance values which may be in the form of performance data or performance counters. The sample performance values are selectively sent to a management server. Sample performance values are taken based on a set frequency. If a collected sample performance value falls outside a defined delta value of a last collected sample performance value, the collected sample performance value is sent to the management server. Otherwise, if the collected sample value is within the define delta value, the collected sample performance value is not sent to the management server.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques in which client or computing devices selectively send sample performance values to a management server to compare with previously collected sample performance values.

Figure 1:
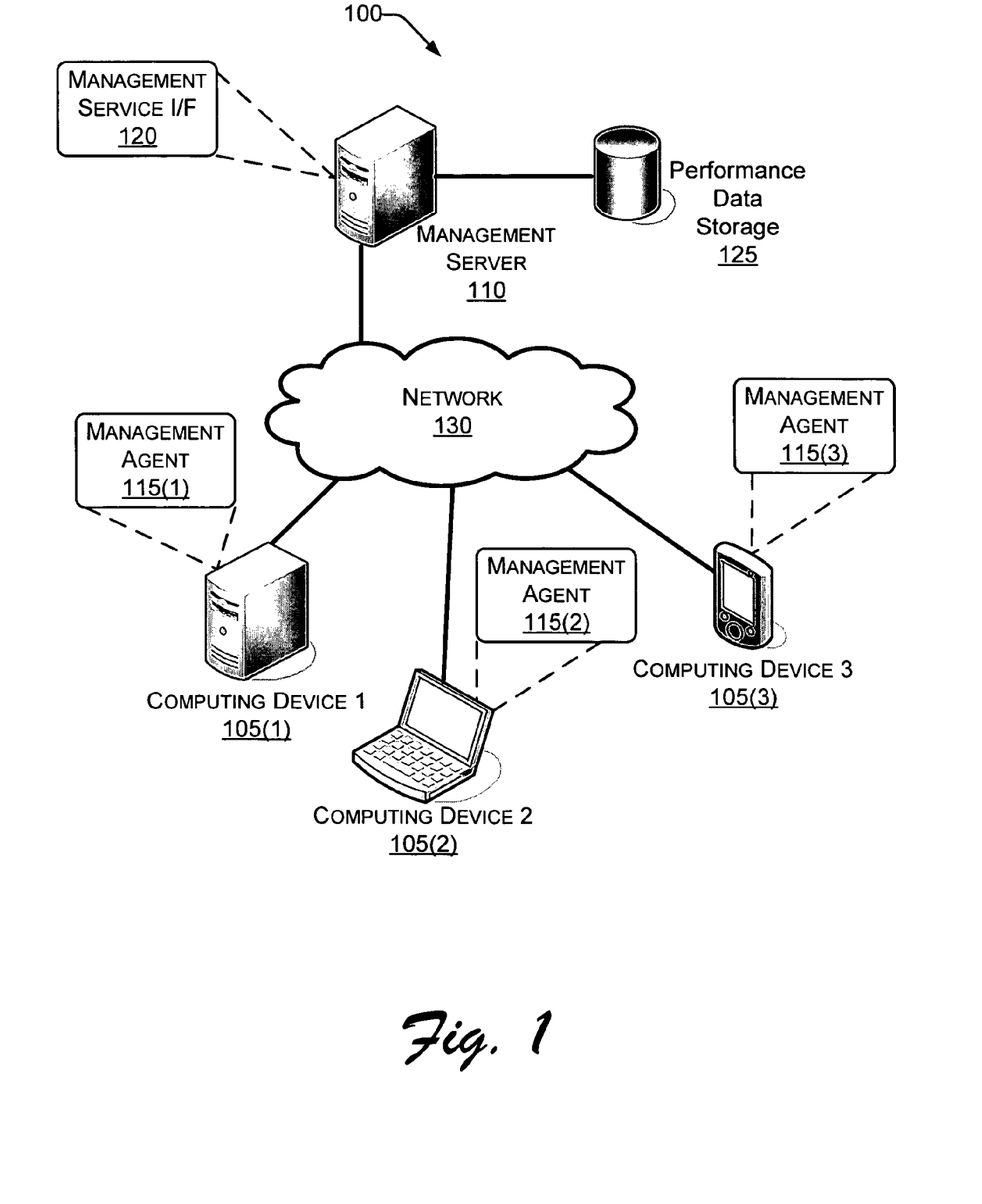
FIG. 1 is an illustration of a management system that selectively provides performance data of computing devices to a management server.

FIG. 1 shows a management system 100 that provides selective performance data or performance counters from computing devices to a management server. The selective performance data or performance counters may be referred to as sample performance values. In management system 100, sample performance values are collected by clients, represented by "computing device 1" 105(1), "computing device 2" 105(2), and "computing device 3" 105(3), and sent to management server 110.

Computing devices 105 are managed by management server 110. Management server 110 may provide a service (e.g., applications, data, etc.) to computing devices 105 and monitor performance of computing devices 105. In an embodiment, performance is monitored by the management server 110 by receiving performance data from the computing devices 105. In order to reduce network congestion or traffic due to transmission (i.e., sending and receiving) of the performance data, computing devices 105 send sample performance values when there is a sufficient or significant change from a last sent sample performance value. A change is deemed sufficient if it varies a predefined delta from the last sample performance value. If the performance value does not change significantly, it is not collected as a sample and hence not sent to the management server.

In this example, "computing device 1" 105(1) is shown as a desktop personal computer (PC). "Computing device 2" 105(2) is shown as a laptop PC. "Computing device 3" 105(3) is shown as a personal digital assistant (PDA). It is contemplated that in other cases, management system 100 includes other computing devices such as smart phones, media players, dedicated server computers, and the like.

As part of the management system 100, each of computing devices 105 includes a management agent 115 that monitors sample performance values that are provided at computing devices 105. In particular, the management agent determines if sample performance values are to be sent from computing devices 105 based on a change or delta from previous sample performance values.

Management server 110 includes a management service interface 120 that communicates with the management agents of computing devices 105. Management agents 115 (as well as updates of management agents) of computing devices 105 may be received from management server 110. The management agents 115 and management service interface 120 are discussed in greater detail below.

Management server 110 is connected to a storage 125 to store performance counter or performance data. Sample performance values (i.e., performance data or performance counters) received from computing devices 105 are stored in performance data storage 125 and may be accessed either through management server 120 or through another device. The sample performance values may be analyzed to determine trends or potential problems.

A network 130 connects computing devices 105-115 with management server 120. In particular, the network 130 allows management server 120 to access and receive selective sample performance values from computing devices 105-115. The selective sample performance values are sent based on a defined delta value used by computing devices 105-115. The use of the delta value is described further below.

Figure 2:
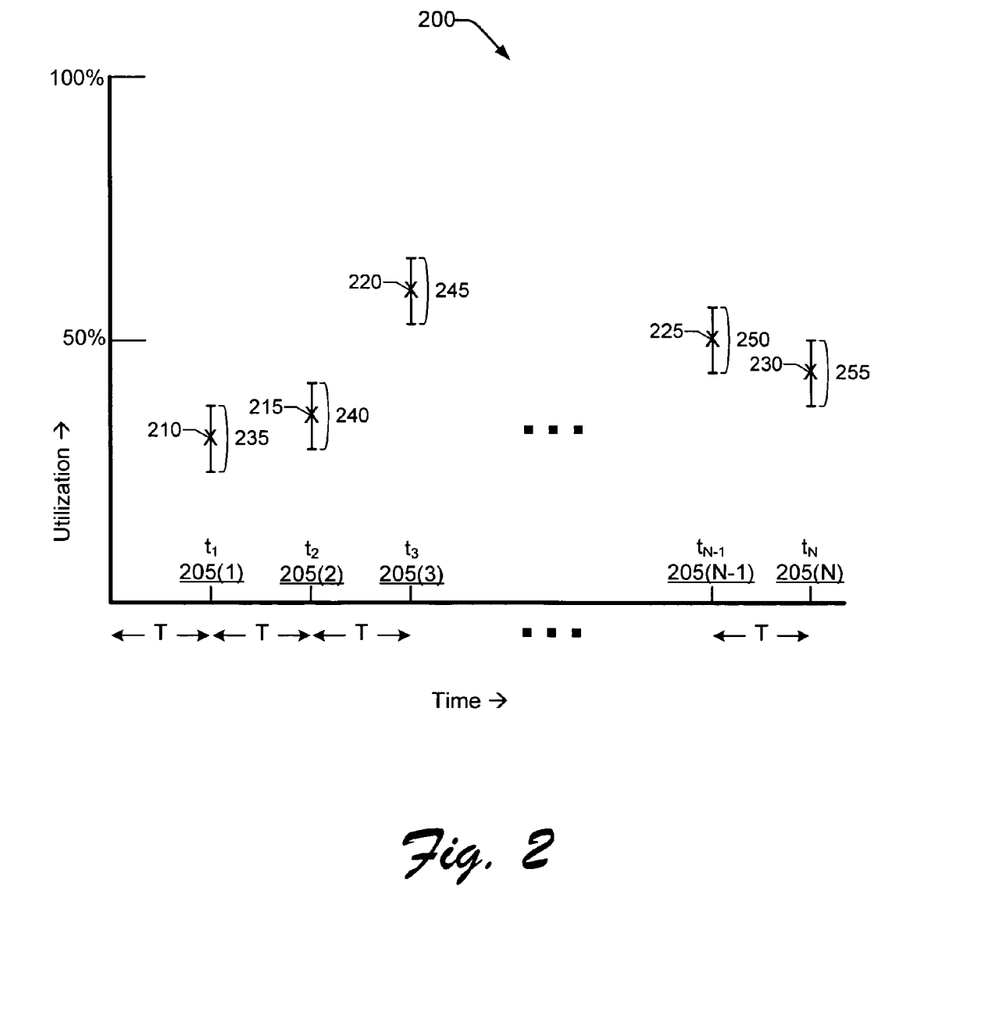
FIG. 2 is a plot of sample performance values taken at a computing device over time.

FIG. 2 shows a plot 200 of sample performance values taken at a computing device. Plot 200 in particular is based on sample performance values taken by a computing device at distinct times $t_1$ 205(1) to $t_N$ 205(N). Although one plot 200 is shown, it is expected that multiple plots may be derived based on various computing device resources such as processor usage, memory usage, disk usage, etc.

In this example, samples are taken based on percentage utilization (i.e., utilization of a computing device resource) at a particular time. Examples can include client processor utilization and disk utilization. Sample performance values (i.e., performance data or performance counters) are taken over a fixed and known frequency "f" which translates to a time period of "T". Therefore, times 205 are spaced per a time period of "T". Sample performance values are taken every "T" units of time.

In this example, at the computing device, a sample performance value 210 is taken at $t_1$ 205(1), a sample performance value 215 is taken at $t_2$ 205(2), a sample performance value 220 is taken at $t_3$ 205(3), a sample performance value 225 is taken at $t_{N-1}$ 205(N-1), and a sample performance value 230 is taken at $t_N$ 205(N). Intermediate sample performance values are taken between times $t_3$ 205(3) and $t_{N-1}$ 205(N-1).

A delta value is associated with each of the sample performance values. The delta value is the same for each of the sample performance values. The delta value may be a plus or minus value relative to each of the actual sample performance values. For example, the delta value may be +/−5% utilization of an actual sample performance value.

In particular, a delta value 235 is associated with sample performance value 210, a delta value 240 is associated with sample performance value 215, a delta value 245 is associated with sample performance value 220, a delta value 250 is associated with sample performance value 225, and a delta value 255 is associated with sample performance value 230.

Delta values 235-255 are used to determine if a sample performance value (along with a time) is to be sent to a management server. Specifically, if a sample performance value falls within a delta value of an immediately preceding sample performance value, that particular performance value is not sent to the management server. Alternatively, if a sample performance value falls outside of a delta value of an immediately preceding sample performance value, that particular sample performance value is sent to the management server. A first sample performance value (e.g., sample performance value 210) may be sent to the management server to establish an initial sample performance value at the computing device and the management server.

In this example, sample performance value 215 value falls within the delta value 235 of preceding sample performance value 210. Therefore, sample performance value 215 is not sent to the management server. Sample performance value 220 is outside of delta value 240 of preceding sample performance value 215. Therefore, sample performance value 220 is sent to the management server.

Figure 3:
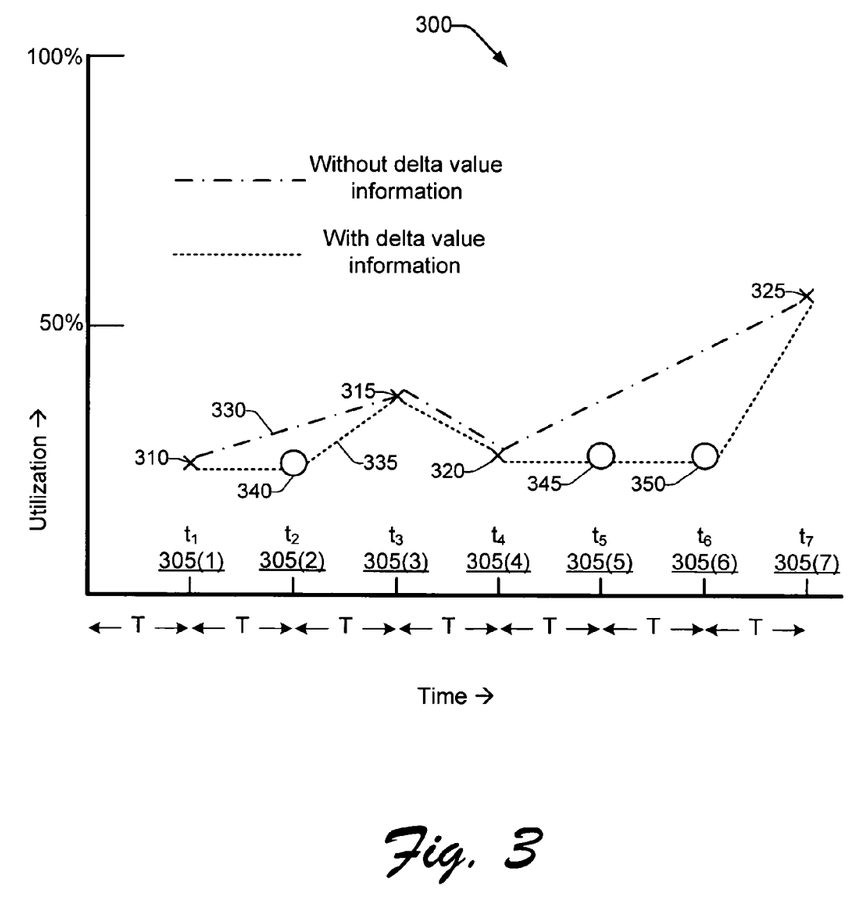
FIG. 3 is a plot of received and derived sample performance values from a computing device.

FIG. 3 shows a plot 300 of sample performance values received from a computing device. In particular, plot 300 is created based on actual and interpolated sample performance values. Sample performance values may be in the form of performance data or performance counters. Sample performance values may be values received by a management server (e.g., management server 110) and stored in a separate storage device (e.g., performance counter storage 125). Furthermore, although one plot 300 is shown, it is expected that multiple plots may be created based on various sample performance values (i.e., performance data or performance counters) received from client or computing devices (e.g., computing devices 105).

In this example, sample performance values are plotted based on percentage utilization of a particular computing device resource (e.g., processor, memory, disk, etc) over time. Based on a known frequency "f" in which the sample performance values were taken at the computing device, sample performance values are plotted at particular times. In certain cases, a received sample performance value may include a particular time. It is expected that a performance value can be couple or value pair (i.e., time and value); however due to propagation delays, the time a sample is received at the server is not a reliable way to determine when the sample was measured. In this example, the known frequency "f" translates to a time period of "T". Times $t_1$ 305(1) to $t_7$ 305(7) occur or are plotted every "T" units of time.

In certain cases, as discussed above in reference to FIG. 2, some sample performance values will be sent from the computing devices and some sample performance values will not be sent, depending if sample performance values fall within a delta value of preceding (i.e., last collected) sample performance values.

In this example, sample performance values 310, 315, 320, and 325 represent those sample performance values received from the computing devices. Without knowing that a delta value is used, received sample performance values are simply connected to one another. In other words, sample performance value 310 is connected to sample performance value 315, sample performance value 315 is connected to sample performance value 320, and sample performance value 320 is connected to sample performance value 325. The line 330 that is plotted may not adequately represent the trend in performance data or sample performance values.

By knowing that a delta value is used in collecting or sending sample performance values, a more accurate line 335 representing trends in performance data is plotted. In specific, sample performance values that are not received are interpolated between received sample performance values. In certain cases, sample performance values not received may be extrapolated from a last received sample performance value.

Sample performance values that are not received are known to be within a delta value of preceding sample performance values that are received. Therefore, sample performance values that are not received are designated with a value of the preceding sample performance value. In this example, sample performance value 340 at time $t_2$ 305(2), sample performance value 345 at $t_5$ 305(5), and sample performance value 350 at time $t_6$ 305(6) are interpolated. The resulting line connecting received and interpolated sample performance values with delta value information shows a more correct representation of the performance data trends than the line without delta value information that only connects actual received sample performance values.

Figure 4:
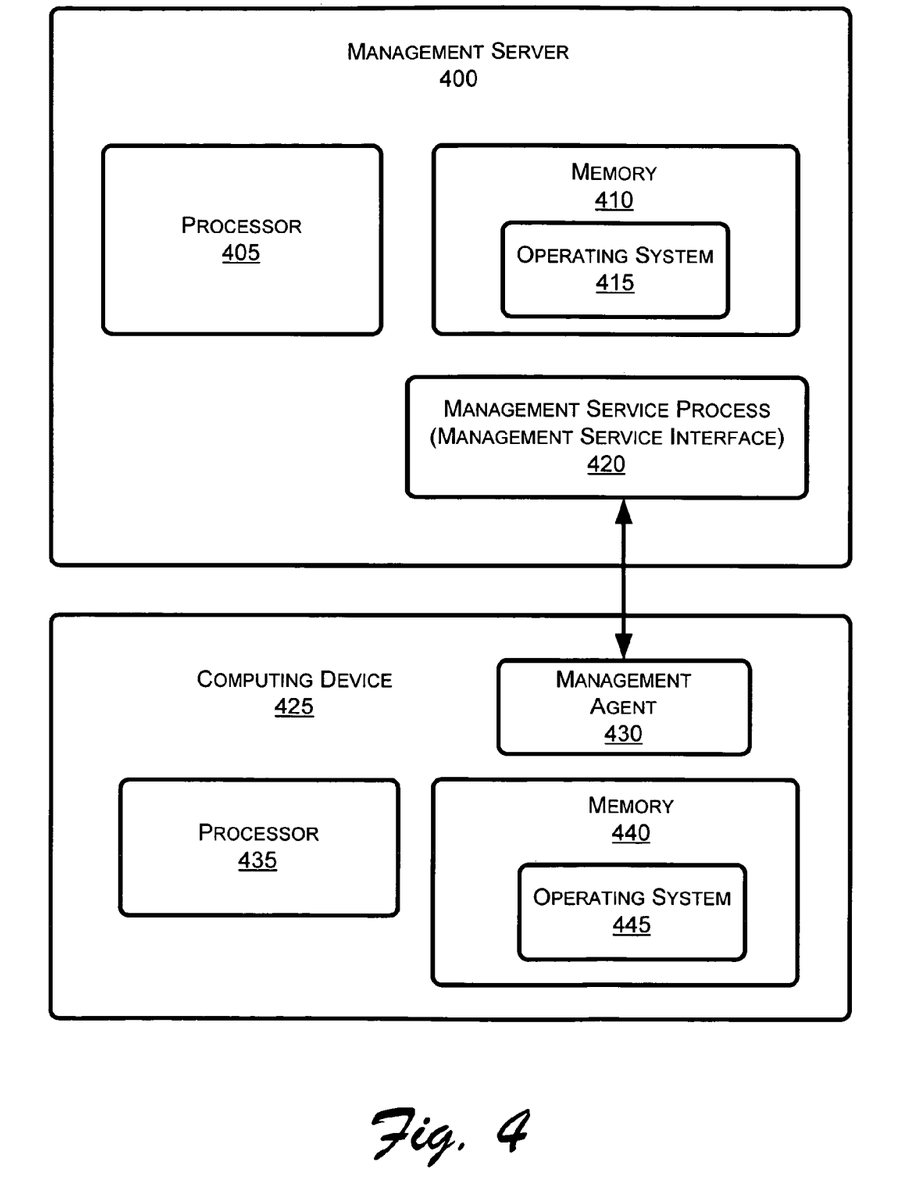
FIG. 4 is a block diagram of a management server that receives sample performance values from computing devices.

FIG. 4 shows a management server 400 that receives performance data from computing devices. In this example, management server 400 includes management server 110 of FIG. 1. Management server 400 has a central processing unit (CPU) or processor 405 and a memory 410. Processor 405 accesses memory 410 through a system bus (not shown). The memory 410 may store an operating system 415.

A management service process component or management service interface 420 (e.g., management service interface 120 of FIG. 1) is included in management server 400. Management service interface 420 provides for connecting to particular computing devices. Furthermore, through management service interface 420, performance data (i.e., performance counters, sample performance values) may be received from the computing devices. Management service interface 420 connects with one or more computing devices such as computing device 425.

Computing device 425 is representative of any one of the computing devices 105 of FIG. 1. Computing device 425 has a management agent 430 (which may also be included in memory) that communicates with management server 400, and particularly with management server interface 420. Management agent 430 is particularly used to selectively gather and send sample performance values (i.e., performance data or performance counters) from computing device 425 and also is used to compare deltas in determining if a sample performance value is to be sent to the management server 400.

The sample performance values are sent to management server 400. Management agent 430 and updates to management agent 430 may be provided by the management server 400. A processor 435 is included in computing device 425. Processor 435 is particularly configured to access and control management agent 430, such as through a system bus (not shown). Furthermore, processor 435 accesses a memory 440, where access may be through the system bus (not shown). Stored on memory 440 is an operating system 445. In certain embodiments, management agent 430 may also be stored in memory 440.

Figure 5:
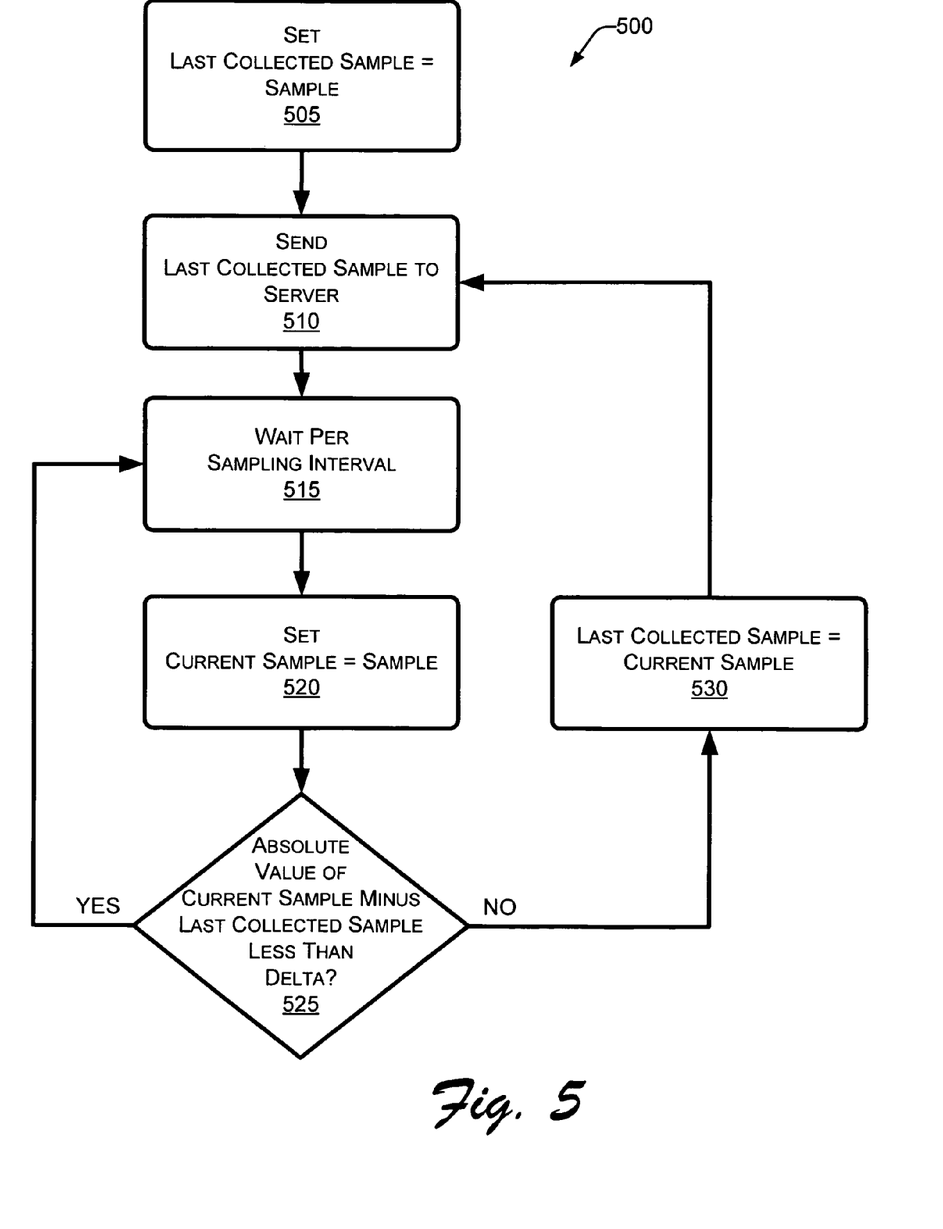
FIG. 5 is a flow diagram illustrating a process for sending selective performance values to a management server.

FIG. 5 shows a process 500 a process for a computing device to selectively send sample performance values. The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain processes may take place concurrently or in a different order. The process may be implemented, for example, by the management agent 430 at the computing device 425, although the process may be implemented by other architectures.

At block 505, an initial sample performance value or performance data (i.e. performance counter) is taken at the computing device. This "sample" performance value is set to a "last collected sample" value.

At block 510, the "last collected sample" performance value is sent to the management server. Along with a value (i.e., performance data, performance counter), a time at which the value was taken may also be sent to the server.

At block 515, a wait is performed based on a predefined time period. The time period may be time period "T" discussed above. The time period may also be defined by a particular frequency, such as frequency "f" discussed above.

At block 520, a succeeding "sample" performance value is taken or calculated at the succeeding time after the wait is performed. The "current sample" performance value is then set to the collected "sample" performance value.

If the absolute value of the difference between the "current sample" minus the "last collected sample" is less than a predetermined delta value (i.e., following the YES branch of block 525), another wait is performed based on the sampling interval for consideration of the next sample (block 515). In other words, a determination is made as to whether the current sample falls outside the delta value. If the absolute value of the "current sample" minus the "last collected sample" is not less than a predetermined delta value (i.e., following the YES branch of block 525), the "last collected sample" is set to the "current sample" and the last collected sample is sent to the management server (block 510).

Figure 6:
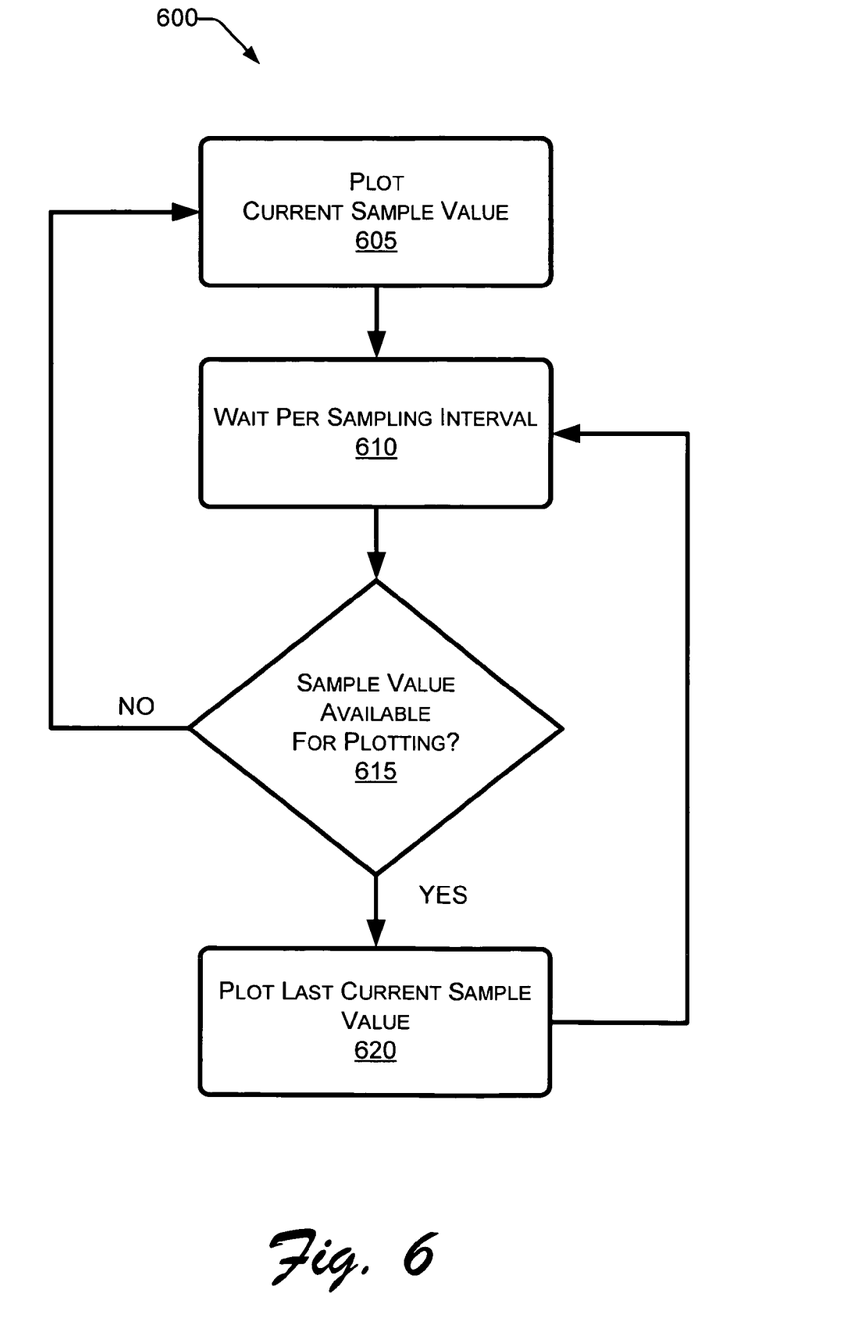
FIG. 6 is a flow diagram illustrating a process for plotting received and derived sample performance values from a computing device.

FIG. 6 shows a exemplary process 600 for plotting sample performance values from a computing device. The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain processes may take place concurrently or in a different order. The process may be implemented, for example, by the management service process 420 at the management server 400, although the process may be implemented by other architectures.

At block 605, a current sample performance value is plotted. The current sample performance value may be an initial sample performance value received from a computing device. The current sample performance value and all other sample performance values that are plotted are directed to a particular computing device resource (e.g., processor) or process (e.g. management server to computing device interconnection). The current sample performance value and other sample performance values may have a time associated with it. In general, the sample performance values are performance data and may be in the specific form of performance counters.

At block 610, a wait is performed based on a frequency at which sample values were collected at the computing device. The wait is for a unit of time or the time period "T" that is the inverse of the frequency. Block 610 is particularly performed when no time is provided or associated with the sample performance values.

After waiting the specified period, a determination as to whether a sample performance value is available for plotting. If no sample performance value is available (i.e., following the "NO" branch of block 615), the value of the current sample performance value is plotted (i.e., block 605) against the new time after the wait is performed (i.e., block 610). In this matter, the process interpolates the next performance value as illustrated in plot 300 of FIG. 3.

If a sample performance value is available (i.e., following the "YES" branch of block 615), that available sample performance value is plotted (block 620) as illustrated in plot 300 of FIG. 3.

CONCLUSION

The above-described methods and computer describe providing select performance data and constructing plots based on the select performance data. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   configuring a plurality of computing devices to communicate with a management server via a network having limited bandwidth, wherein each computing device includes a computing device processor for executing operations on the computing device, wherein the management server includes a server processor for executing operations on the management server;
   activating a management service on the management server by the server processor;
   activating management agents on each of the plurality of computing devices by the corresponding computing device processors;
   monitoring computing device resources on each computing device by the corresponding management agent active on that computing device;
   sending by each management agent to the management service a first sample performance value representative of a performance of the computing device resources taken at a first point in time, whereby an initial sample performance value and initial point in time is established at the management server for each computing device;
   taking, by each management agent on each computing device, succeeding sample performance values for that computing device at succeeding points in time according to a defined frequency known to each computing device and the management server;
   determining, by each management agent on each computing device, whether a particular succeeding sample performance value differs from an immediately preceding sample performance value by a predetermined percentage, wherein the predetermined percentage defines a range greater than zero defined by a positive value greater than the immediately preceding sample performance value and a negative value less than the immediately preceding sample performance value;
   sending, by each management agent on each computing device, the particular succeeding sample performance value and a corresponding time value to the management server when the particular succeeding sample performance value differs from the immediately preceding sample performance value by more than the predetermined percentage, and not sending the particular succeeding sample performance value when the particular succeeding sample performance value does not differ from the immediately preceding sample performance value by more than the predetermined percentage, so that bandwidth usage of the network by the management agents is minimized;
   receiving, by the management service from each of the computing devices, the first sample performance values taken at the first points in time, and the particular succeeding sample performance values which differed from the immediately preceding sample performance values by more than the predetermined percentage;
   plotting, by the management service, the sample performance values received from the computing devices on corresponding plots relative to the times at which the sample performance values were taken, wherein for succeeding points in time according to the defined frequency at which the management server does not receive succeeding sample performance values, the management server plots points in the plots corresponding with values of a most recently received sample performance value for each corresponding computing device.

2. The method of claim 1, wherein the sample performance values are directed to utilization of the computing device processor of each computing device.

3. The method of claim 1, wherein the sample performance values are directed to utilization of a processor on each of the computing devices.

4. The method of claim 1, further comprising:
   prior to activating the management agents on each of the plurality of computing devices, receiving the management agents at each of the computing devices from the management server.

5. The method of claim 1, wherein the sample performance values are directed to utilization of a memory on each of the computing devices.

6. The method of claim 1, wherein the sample performance values are directed to performance of one or more processes running on each of the computing devices.

7. One or more computer-readable storage media comprising computer-executable instructions implemented by the processors on the computing devices and the management server for performing the method as recited in claim 1.

8. A computing device comprising:
   a processor coupled to a memory; and
   a management agent accessed and controlled by the processor, the management agent configured to communicate with a management server and provide the management server with selective sample performance values collected at the computing device indicative of performance of the computing device,
   wherein the management agent is configured to provide the management server with a first sample performance value taken at a first time, and take a plurality of succeeding sample performance values indicative of performance of the computing device at corresponding succeeding times based on a defined frequency at which the succeeding sample performance values are taken,
   wherein the defined frequency is fixed and known to the computing device and the management server,
   wherein, for each particular succeeding sample performance value taken, the management agent is configured to determine whether the particular succeeding sample performance value is within a delta value determined based on an immediately preceding sample performance value, wherein the delta value is a defined range greater than zero defined by a positive value greater than the immediately preceding sample performance value and a negative value less than the immediately preceding sample performance value, and send the sample performance value to the management server when the particular succeeding sample performance value is outside the delta value with respect to the immediately preceding sample performance value, and not send the particular succeeding sample performance value when the particular succeeding sample performance value is within the delta value with respect to the immediately preceding sample performance value, wherein the management server is configured to create a plot of sample performance values received from the computing device in correlation with corresponding time values according to the defined frequency that is fixed and known to the management server, wherein the management server creates the plot based on the first sample value and taken at the first time received from the computing device, wherein for succeeding points in time according to the defined frequency at which the management server does not receive succeeding sample performance values, the management server plots a point in the plot corresponding with a value of a most recently received sample performance value.

9. The computing device of claim 8, wherein the management agent is configured to communicate with a management service interface of the management server, wherein the management agent is updated by updates received from the management server.

10. The computing device of claim 8, wherein the delta value is a specified percentage of plus or minus change over the immediately preceding sample performance value.

11. The computing device of claim 8, wherein the sample performance values include a percentage of utilization of the processor of the computing device at the points in time.

12. A method implemented by a computing device, the method comprising:

connecting the computing device to a network having limited bandwidth, the computing device being configured to periodically communicate with a management server via the network, wherein the computing device includes a computing device processor and a computing device memory for executing operations on the computing device, wherein the management server includes a server processor and a server memory for executing operations on the management server;

determining, by the computing device, at a first point in time, a first sample performance value indicative of performance of the computing device at the first point in time;

sending, by the computing device, the sample performance value to the management server, whereby an initial sample performance value and initial point in time is established at the computing device and the management server;

taking a plurality of succeeding sample performance values indicative of performance of the computing device at corresponding succeeding points in time based on a defined frequency at which the succeeding sample performance values are taken, wherein the defined frequency is fixed and known to the computing device and the management server, wherein for each particular succeeding sample performance value taken at each point in time in the defined frequency by the computing device, the method executed by the computing device further comprises:

determining whether the particular succeeding sample performance value is within a predetermined delta value determined based on an immediately preceding sample performance value by determining whether an absolute value of a difference between the particular succeeding sample and the immediately preceding sample is less than the predetermined delta value, wherein the delta value is a defined range greater than zero defined by a positive value greater than the immediately preceding sample performance value and a negative value less than the immediately preceding sample performance value; and sending the particular succeeding sample performance value to the management server when the particular succeeding sample performance value is greater than the predetermined delta value with respect to the immediately preceding sample performance value, and not sending the particular succeeding sample performance value when the particular succeeding sample performance value is within the predetermined delta value with respect to the immediately preceding sample performance value, wherein the corresponding time values are sent with the particular succeeding sample performance values that are sent to the management server, and wherein the management server creates a plot of sample performance values received from the computing device in correlation with corresponding time values according to the defined frequency that is fixed and known to the management server, wherein the management server creates the plot based on the initial sample value and the initial point in time received from the computing device, wherein for succeeding points in time according to the defined frequency at which the management server does not receive succeeding sample performance values, the management server plots a point in the plot corresponding with a value of a most recently received sample performance value.

13. The method of claim 12, wherein the delta value is a specified percentage of plus or minus change over the immediately preceding sample performance value.

14. The method of claim 12, wherein the sample performance values include a percentage of utilization of the one or more processors at the computing device at the points in time.

15. The method of claim 12, wherein the sample performance values are directed to performance of one or more processes running on the computing device.

16. One or more computer-readable storage media comprising computer-executable instructions implemented by the computing device processor for performing the method as recited in claim 12.

* * * * *